United States Patent [19]
Steinhilber

[11] Patent Number: 5,407,157
[45] Date of Patent: Apr. 18, 1995

[54] DEVICE FOR FIXING A LOADABLE RIGID RETAINING PLATE TO A FURNITURE SURFACE

[76] Inventor: Helmut Steinhilber, Sonnenbergstrasse 40, CH-6052 Hergiswil, Switzerland

[21] Appl. No.: 58,235

[22] Filed: May 10, 1993

[30] Foreign Application Priority Data

May 19, 1992 [DE] Germany .......................... 42 16 515.6
Sep. 9, 1992 [EP] European Pat. Off. ........... 92115407

[51] Int. Cl.⁶ ............................................. A47G 1/17
[52] U.S. Cl. .................... 248/205.3; 248/553
[58] Field of Search ............... 248/205.3, 205.4, 205.2, 248/551, 553, 552; 108/97

[56] References Cited

U.S. PATENT DOCUMENTS

| | | | |
|---|---|---|---|
| 602,708 | 4/1898 | Siegfried | 108/97 |
| 4,570,887 | 2/1986 | Banister | 248/223.4 X |
| 4,613,109 | 9/1986 | Boscacci | 248/553 |
| 4,934,522 | 6/1990 | Nelson | 248/205.31 |
| 5,116,015 | 5/1992 | Gassaway | 248/553 |
| 5,152,593 | 10/1992 | Domenig | 248/205.2 X |
| 5,209,445 | 5/1993 | Bergetz | 248/551 |
| 5,211,458 | 5/1993 | Yale | 248/909 X |
| 5,259,519 | 11/1993 | Lieberman | 248/205.3 X |
| 5,282,427 | 2/1994 | Steinhilber | 108/97 |
| 5,297,768 | 3/1994 | Denton | 248/205.2 X |

FOREIGN PATENT DOCUMENTS

| | | | |
|---|---|---|---|
| 344843 | 11/1936 | Italy | 108/97 |
| 680414 | 8/1992 | Switzerland | 108/97 |
| WO-A-8 102248 | 7/1981 | WIPO | |

Primary Examiner—J. Franklin Foss
Attorney, Agent, or Firm—Irvin A. Lavine; Nath, Amberly & Assn.

[57] ABSTRACT

A device for attaching a retaining plate to a furniture surface which includes a rigid retaining plate which is subject to loads, such as to a moment tending to rotate it about an edge. A flexible anchor plate is secured to the furniture surface by a releasable adhesive. The rigid retaining plate and the flexible anchor plate have an interlocking structure which removably connects them together, specifically projections and recesses, which releasably lock the plates together with the under surface of the rigid retaining plate in substantial engagement with the upper surface of the flexible anchor plate. A moment applied to the retaining plate is resisted by the entire body of adhesive, since the anchor plate is prevented from flexing by the rigid retaining plate. Upon separation of the retaining plate from the anchor plate, the flexible anchor plate may be peeled from the furniture surface.

14 Claims, 4 Drawing Sheets

DEVICE FOR FIXING A LOADABLE RIGID RETAINING PLATE TO A FURNITURE SURFACE

BACKGROUND OF THE INVENTION

The invention relates to a device for fixing a loadable rigid retaining plate to a furniture surface clause of claim 1.

In a device of this type shown in FIG. 8 of Steinhilber, U.S. Pat. No. 5,282,427, a retaining plate is placed flat on a desk top and fixed thereto by means of a stick-on textile hook and loop fastener, one part of which is bonded to the desk top. The retaining plate carries a vertical support post, which is suitable for holding different functional elements, for example the platform of a raised work stand, of a monitor holder, of a telephone arm, of a lamp or the like. Thereby any kind of writing desks and workbenches can be retrofitted by means of the vertical support post.

Securing the retaining plate on the desk top has the advantage compared with conventional clamping devices that the attaching structure is independent of the form of the desk top and of the furniture. In particular, this type of attaching structure can be used for any thickness of the desk top, for any edge form of the desk top and even for desk tops that do not project over the body.

The retaining plate can be removed from the furniture surface without causing damage thereto. For this purpose, the rigid retaining plate is first separated in the region of the stick-on fastener. The part of the stick-on hook and loop fastener bonded to the furniture surface can then be separated from the furniture surface. Since this part is flexible, it can be detached carefully from the furniture surface without causing damage thereto. This would be difficult if the rigid retaining plate were bonded directly to the furniture surface, since the adhesive compound would have to be torn away simultaneously over the entire bonded area.

Nevertheless, separation of the stick-on hook and loop fastener can cause difficulties, especially in the case of a large-area stick-on hook and loop fastener that is suitable for larger loads, since the rigid structure of the retaining plate means that substantially the entire surfaces of the two stick-on hook and loop fastener must be separated simultaneously. Such separation is certainly possible, since the stick-on hook and loop fastener has minimum elastic compliance perpendicular to its plane, meaning that the retaining plate can be pried up progressively, starting at one end, by means of a lever tool, for example. This small elastic compliance of the stick-on fastener can also lead to undesired gradual loosening of the adhesive compound, however, especially if a very large tilting moment acts on the retaining plate for a prolonged time.

The object of the invention is to provide a device for securing a rigid retaining plate to a furniture surface, which plate combines high loadability with simple detachability of the securing structure.

SUMMARY OF THE INVENTION

In the device according to the invention, the retaining plate is fixed to the furniture surface, for example to the desk top of a workbench or writing desk. The retaining plate does not project beyond the edge of the furniture surface, and so fixing to any desired furniture surface, in any desired region of the furniture surface, is possible regardless of the form of the article of furniture. All advantages of the known attaching structure are therefore achieved in the same way.

An anchor plate is bonded to the furniture surface, preferably by using a detachable adhesive. The retaining plate is fixed positively to this anchor piece. The positive interlocking of the rigid retaining plate with the anchor plate permits simple fixing of the retaining plate on the anchor plate and also easy detachment of the retaining plate from the anchor plate. The anchor piece itself is elastically compliant, deformable or flexible, so that if necessary it can be detached relatively easily from the furniture surface by successively separating it and peeling it up, starting from one edge or one corner. If necessary, a solvent can also be applied for this purpose.

As soon as the rigid retaining plate is joined to the anchor plate, the anchor plate is completely stiffened by the retaining plate, and so warping or deformation of the anchor piece is no longer possible. When the retaining plate is in place, therefore, the adhesive compound between anchor piece and furniture surface can no longer be detached progressively along a parting line, but separation of the adhesive compound would now be possible only simultaneously over the entire area of the adhesive compound. Thereby the adhesive fixing of the retaining plate can absorb a large load, especially due to tilting moments tending to rotate said retaining plate about a horizontal line at an edge thereof.

The positive connection of the retaining plate to the anchor plate permits simple removal of the retaining plate if the retaining plate and functional elements attached thereto must be removed for a short time or if a retaining plate with one functional element must be replaced by a retaining plate with a different functional element. If the device must be removed completely, the positive connection is separated and the rigid retaining plate removed, after which the anchor plate, which is now freely accessible and no longer stiffened by the rigid retaining plate, is detached from the furniture surface, in which process the anchor plate can be peeled up carefully and separated along a moving parting line. If necessary, a solvent for the employed adhesive can be applied through the anchor plate over the entire bonded surface or along the respective parting line between anchor plate and furniture surface.

The positive connection and interlocking of retaining plate and anchor plate can be achieved in diverse ways. Preferably the anchor plate is placed flat on the retaining plate. Projections and recesses of the mating surfaces of the anchor plate and retaining plate therefore engage positively in each other. Thus the retaining plate can be placed on the anchor plate bonded to the furniture surface and interlocked by pushing it laterally. The anchor plate is then completely covered by the retaining plate, so that the fixing means attaching structure are not visible and an appearance of pleasing form is provided.

In one embodiment, a large-area anchor plate is provided. In order to permit simple detachment of the anchor plate from the furniture surface when needed, the anchor plate is divided into specified break lines. As long as the anchor plate is stiffened by the rigid retaining plate, these specified break lines are inactive and the entire surface of the anchor plate provides a continuous surface with the adhesive compound. If the retaining plate is removed, the anchor plate can be detached from the furniture surface as separate individual zones subdivided by the specified break lines, so that a smaller bonded area and thus easier detachment are provided in each case.

BRIEF DESCRIPTION OF THE DRAWINGS

The invention is explained in more detail in the following by reference to practical examples illustrated in the drawing, wherein.

DESCRIPTION OF THE PREFERRED EMBODIMENTS

Figure 1:
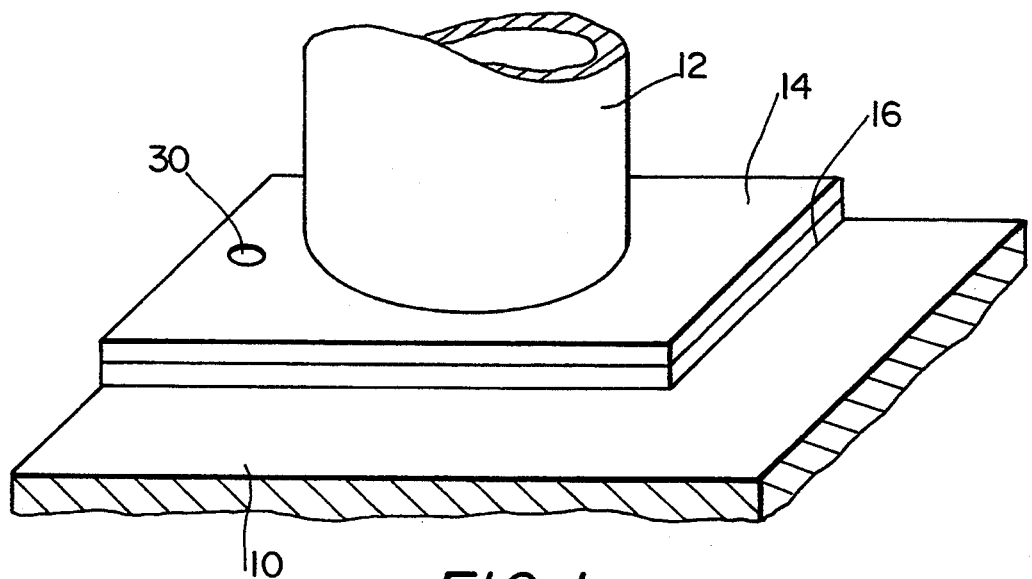
FIG. 1 is a perspective view of the device for fixing a retaining plate, which carries a support post.
Figure 2:
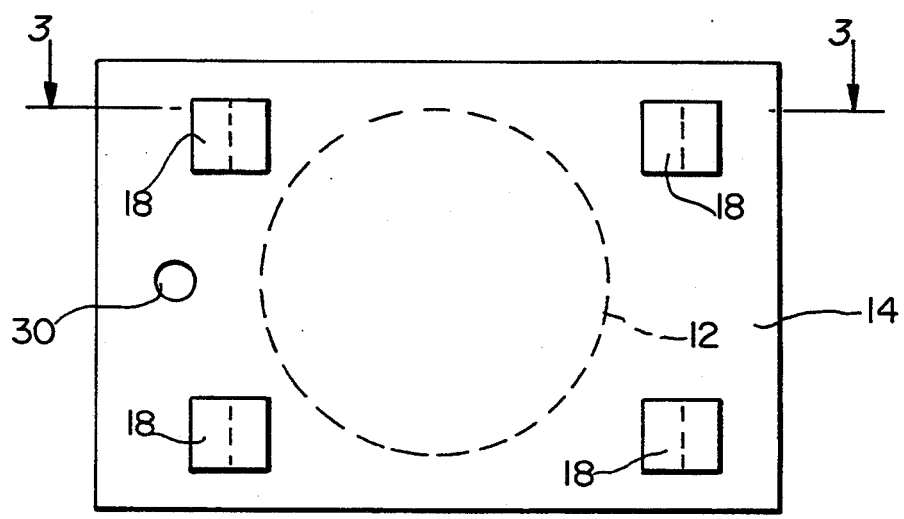
FIG. 2 is a view of the retaining plate from underneath.
Figure 3:
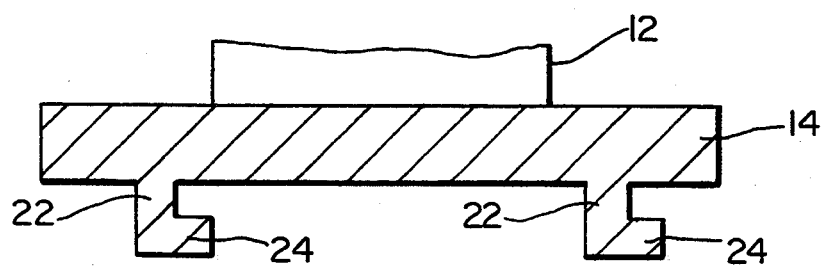
FIG. 3 is a vertical section through the retaining plate along the section line III—III in FIG. 2.
Figure 4:
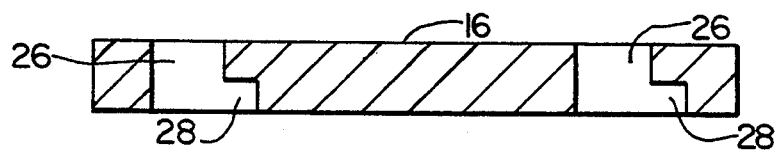
FIG. 4 is a vertical section of the anchor plate along the section line IV—IV in FIG. 5.
Figure 5:
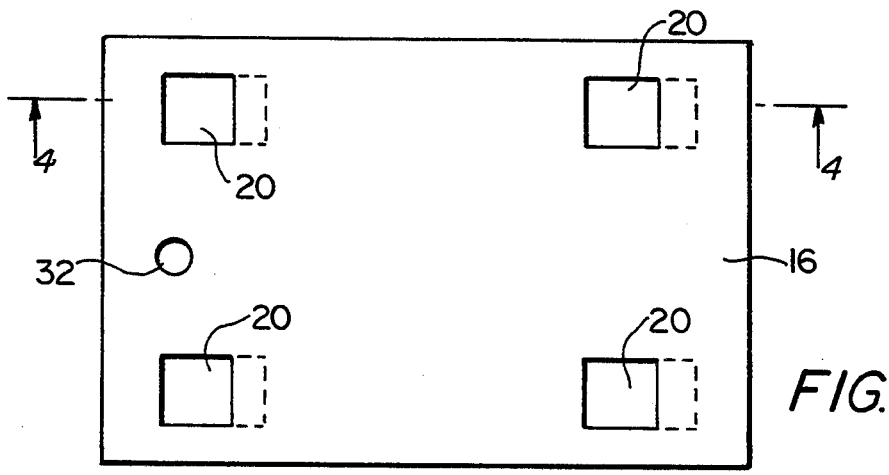
FIG. 5 is a view of the anchor plate from above.
Figure 6:
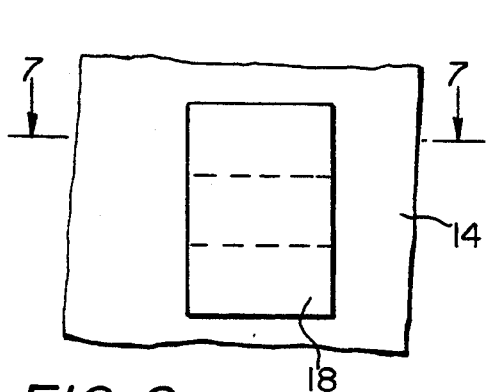
FIG. 6 is in the detail a view from underneath of a projection of the retaining plate in a second embodiment of the device.
Figure 7:
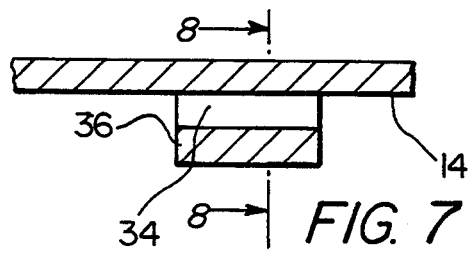
FIG. 7 is a vertical section along the line VII—VII in FIG. 6.
Figure 8:
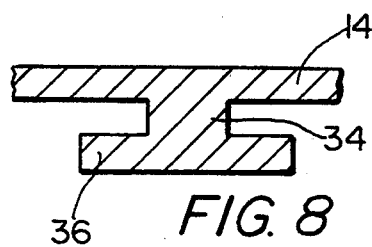
FIG. 8 is a vertical section along the line VIII—VIII in FIG. 7.
Figure 9:
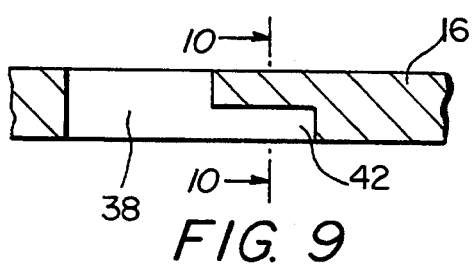
FIG. 9 is a vertical section of a recess of the anchor plate along the section line IX—IX in FIG. 11 in the second embodiment of the device.
Figure 10:
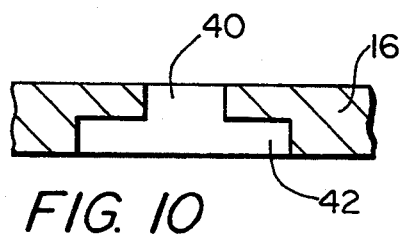
FIG. 10 is a vertical section of the recess along the section line X—X in FIG. 9.
Figure 11:
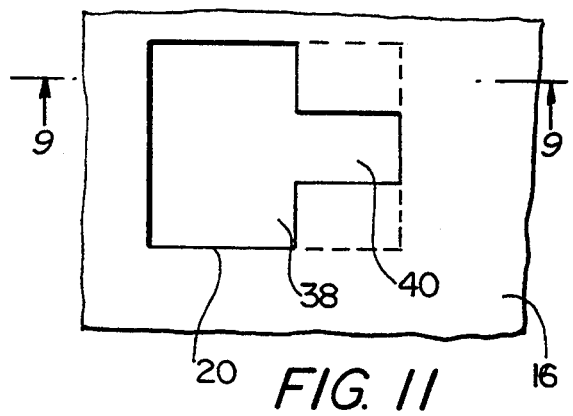
FIG. 11 is a view from above of the recess of the anchor plate.

Referring to FIG. 1, a vertical support post 12 is fixed to a furniture surface 10, for example the working top of a writing desk. The support post 12 is used to carry functional elements, e.g., the platform of a raised work stand, a monitor arm, a telephone arm, a desk lamp or the like.

At the bottom end of the support post 12 there is attached a horizontal, rigid retaining plate 14. The support post 12 and the retaining plate 14 are of a suitable material, for example cast metal or plastic. On the furniture surface 10 there is bonded an anchor piece, specifically an anchor plate 16. An adhesive applied unilaterally to the underside of the anchor plate 16 or a two-sided adhesive tape can be used for bonding the anchor plate 16. The retaining plate 14 and the anchor plate 16 are equal in area and have the same shape, and so when the retaining plate 14 is placed on the anchor plate 16 the two plates visually blend into a single plate. The areal dimensions of the retaining plate 14 and the anchor plate 16 are chosen such that they provide adequate bracing of the support post 12, especially against tilting moments. Accordingly, the retaining plate 14 and the anchor plate 16 can have triangular, rectangular and especially square form; the square form is illustrated in the drawing. To achieve greater bracing effect without limiting the usable furniture surface 10 too much, the retaining plate 14 and the anchor plate 16 can be formed by two or more rails placed on the furniture surface 10 and disposed at an angle, preferably a right angle.

The anchor plate 16 consists preferably of an elastic synthetic material, so that bending of the anchor plate 16 is possible. Thereby detachment of the anchor plate 16 from the furniture surface 10 is facilitated. The anchor plate 16 can be pried up from the furniture surface 10 at one of its corners and then peeled progressively with bending from the furniture surface 10. The bond between the anchor plate 16 and the furniture surface 10 is then progressively separated along only one line at any time. Thereby only slight application of force is necessary for detachment, and the furniture surface 10 is preserved from damage. Preferably a soluble adhesive is used for bonding the anchor plate 16. If the anchor plate 16 has to be detached, a solvent can first be applied in order to facilitate detachment. In order to bring the solvent to the bonded surface, the anchor plate 16 can as desired consist of a porous material or have perforations through which the solvent can reach the bonded surface.

The retaining plate 14 is fixed positively and separately to the anchor plate 16. For this purpose, the underside of the retaining plate 14 is provided with projections 18, which extend positively into recesses 20 of the anchor plate 16. The number of projections 18 and recesses 20 depends on the size and shape of the retaining plate 14 and anchor plate 16 and also on the tilting load to be absorbed by the support post 12. In the practical examples illustrated in FIGS. 1 to 11, the retaining plate 14 and the anchor plate 16 have rectangular form, and a projection 18 and a corresponding recess 20 is provided at each corner.

In the practical example of FIGS. 2 to 5, the projections 18 of the retaining plate 14 each consist of a vertical rectangular block 22 projecting from the underside of the retaining plate 14, at the bottom end of which block a nose 24 projects laterally on one side, parallel to the plane of the retaining plate. The noses 24 of all projections 18 point in the same direction.

The recesses 20 of the anchor plate 16 corresponding with the projections 18 have an insertion opening 26 that passes through the anchor plate 16 and the cross section of which corresponds to the cross section of the face of block 22 and nose 24 of the projections 18. At the underside of the anchor plate 16 there are provided, contiguous with each insertion opening 26, undercuts 28 for the noses 24 of the projections 18. The undercuts 28 are open at the underside of the anchor plate 28, so that the anchor plate 16 with the undercuts 28 is easy to make by production-engineering techniques.

To fix the retaining plate 14 on the anchor plate 16, the retaining plate 14 is placed from above on the anchor plate 16, the projections 18 being inserted into the insertion openings 26 of the recesses 20. As soon as the retaining plate 14 rests flat on the anchor plate 16, the retaining plate 14 is pushed laterally over the anchor plate 16 (to the right in the diagrams of FIGS. 2 to 5), such that the noses 24 of the projections 18 enter the undercuts 28 of the recesses 20. Thereby the retaining plate 14 is interlocked with the anchor plate 16 and cannot be raised up from the anchor plate 16. In this interlocked position, the retaining plate 14 is coincident with the anchor plate 16, as is shown in FIG. 1.

If a tilting moment is applied to the retaining plate 14, the engagement of it over all or a substantial part of flexible anchor plate 16 prevents flexing thereof, and therefore prevents peeling of the flexible anchor plate 16, now effectively rigid, at a line of the adhesive. Hence, the entire adhesive body between anchor plate 16 and the furniture surface 10 resists tilting of the retaining plate and structure attached to it. Upon separation of the retaining plate 16 form the flexible anchor plate 16, the latter may be removed from the furniture surface 10 by a peeling action.

To lock the retaining plate 14 in this interlocked position, the retaining plate 14 has a vertical through-hole 30 and the anchor plate 16 has a vertical hole 32. The holes 30 and 32 are disposed such that they are axially aligned in the interlocked position of retaining plate 14 and anchor plate 16. A locking pin inserted into the holes 30 and 32 locks the retaining plate 14 in the interlocked position, thus preventing any shifting on the anchor plate 16. By withdrawing the locking pin the locked condition can be released again, so that the retaining plate 14 can be pushed laterally and lifted up from the anchor plate 16.

FIGS. 6 to 11 show a second embodiment of the projections 18 and recesses 20.

In this embodiment, the projections 18 consist of a web 34 projecting perpendicularly from the underside of the retaining plate 14, which web has at its bottom end a flange 36, which protrudes on both sides parallel to the plane of the retaining plate 14. The recesses 20 (see FIG. 11) have an insertion opening 38 that passes through the anchor plate 16 and the cross section of which corresponds to the cross section of the flange 36. Contiguous with the insertion opening 38 there is provided a slot 40, the width of which corresponds to the width of the web 34. At the underside of the anchor plate 16, the slot 40 widens on both sides to an undercut 42 for the flange 36. The length of the slot 40 corresponds to the length of the web 34.

If the retaining plate 14 is placed on the anchor plate 16 in order to be attached, the projections 18 are inserted into the insertion openings 38 until the retaining plate 14 is seated on the anchor plate 16. The retaining plate 14 is then pushed laterally over the anchor plate 16, whereby the webs 34 of the projections 18 enter the slots 40 and the flanges 36 respectively enter the undercuts 42. Thereby the retaining plate 14 is interlocked positively with the anchor plate 16. In this embodiment also, a locking pin is used to lock the retaining plate 14 in the interlocked position.

FIGS. 12 to 15 show a third embodiment of the device.

Figure 12:
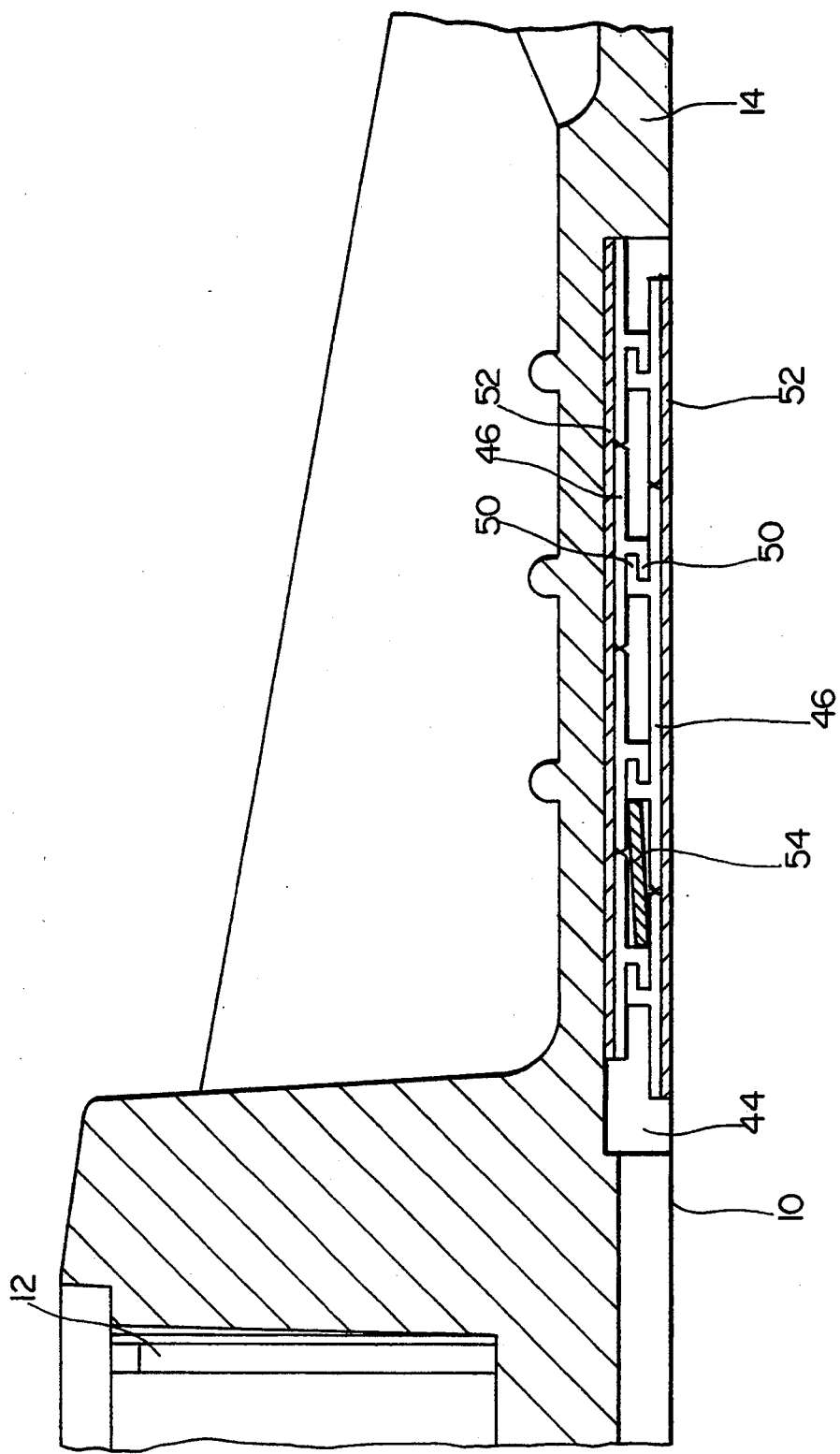
FIG. 12 is a vertical section through a third embodiment.
Figure 13:
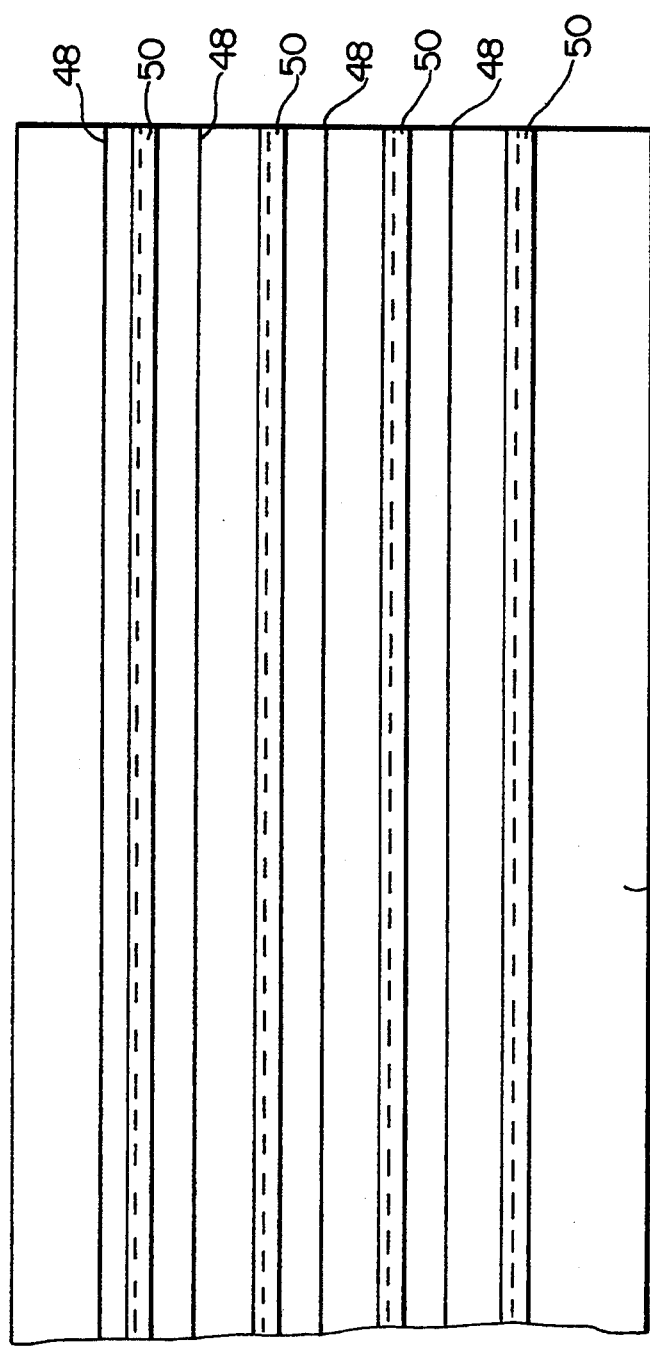
FIG. 13 is a top view of the anchor plate of the device according to FIG. 12.
Figure 14:
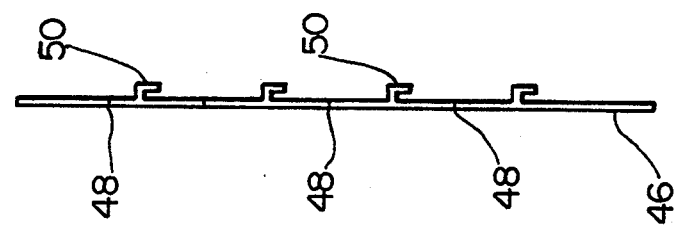
FIG. 14 is an end view of the anchor plate of the FIG. 12
Figure 15:
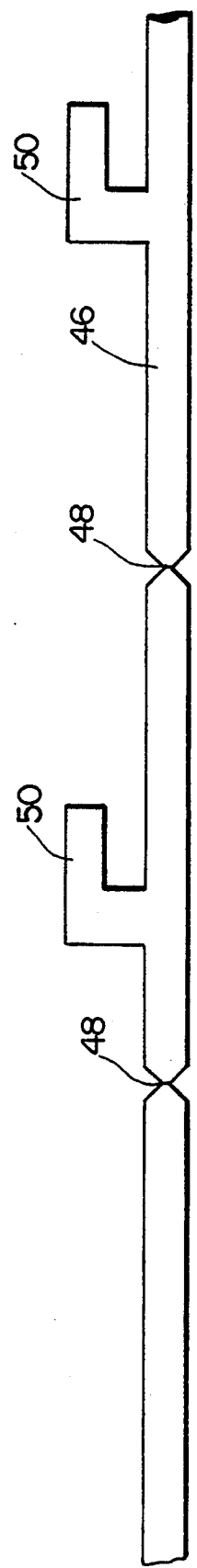
FIG. 15 is an enlarged view of the portion of the anchor plate of FIG. 14 in circle Z.

As the vertical partial section of FIG. 12 shows, at least the peripheral zone of the rigid retaining plate 14 in this embodiment rests directly on the furniture surface 10. The underside of the retaining plate 14 has a shallow relief 44, which is used to receive and attaching structure. The anchor piece in this embodiment is made as an extruded plastic section 46, which is shown in detail in FIGS. 13 to 15. The plastic section 46 is thin-walled, thus permitting high flexibility. The thickness can be 1 mm to 2 mm, for example. The width of the plastic section 46 is chosen such that a sufficient total bonded area is provided. If necessary, two or more plastic sections 46 can be disposed parallel and next to each other on the underside of the retaining plate 14. In one embodiment, for example, the plastic section 46 has a width of about 100 mm. The plastic section 46 is subdivided into narrow strips by parallel specified break lines 48 running in the longitudinal direction, which strips have a width of about 20 mm in the cited practical example. In the region of the specified break lines 48, the plastic section 46 is thinned to a thickness of fractions of a millimeter, so that the individual strips of the plastic section 46 are indeed held together along the specified break lines 48, but can nevertheless be easily separated from each other. On the top side of the plastic section 46 there are formed L-shaped projections 50, which are continuous in the longitudinal direction thereof and which have a free leg parallel to the plane of the plastic section 46, the width of the free leg being a few millimeters (e.g., 3 mm to 4 mm). The clearance between the free leg and the surface of the plastic section 46 corresponds to its material thickness. The clearance and the material thickness of the free leg of the projections 50 correspond, for example, to the material thickness of the plastic section 46, i.e., 1 to 2 mm. In the illustrated practical example, a projection 50 is formed on each strip of the plastic section 46.

To attach the retaining plate 44 on the furniture surface 10, a plastic section 46 is bonded to the furniture surface 10 by an adhesive layer 52 of an adhesive that can be detached again. By means of a corresponding adhesive layer 52, another piece of the plastic section 46 having the same length is inverted relative to the first plastic section 4 and bonded in the relief 44 on the underside of the retaining plate 14. The retaining plate 14 is now placed on the furniture surface 10 in such a way that the projections 50 of the plastic section 46 bonded to the furniture surface 10 and the projections 50 of the plastic section 46 bonded to the retaining plate 14 are offset and parallel to each other. The retaining plate 14 is now laterally at right angles to the direction of the plastic sections 46 (to the left in FIG. 12), so that the projections 50 of the two plastic sections 46 engage with each other by means of their free legs, as can be seen in FIG. 12. The retaining plate 14 is thereby positively attached to the plastic section 46 of the anchor piece 16.

As FIG. 12 shows, the height of the relief 44 is chosen such that the projections 50 of the two plastic sections 46 engage in each other when the retaining plate 14 rests with its peripheral region on the furniture surface 10.

In order to lock the retaining plate 14 in the interlocked position shown in FIG. 12, in which the plastic sections are engaged in each other, a flat bar 54 is pushed in the longitudinal direction of the plastic sections into one of the hollow channels formed by the lower and upper plastic sections 46 plus the projections 50 formed respectively on the lower and upper plastic sections 46. The flat bar 54 has a width that corresponds to the clearance between these profile angle pieces 50, and so the flat bar 54 prevents mutual shifting of the plastic sections 46 bonded to the furniture surface 10 and to the retaining plate 14.

In order to remove the retaining plate 14, the flat bar 54 is withdrawn. The retaining plate 14 can then be pushed laterally (to the right in FIG. 12) such that the projections 50 of the plastic sections 46 become disengaged. The retaining plate 14 is then lifted off. The plastic profile 46 adhering to the furniture top 10 can now be pulled off from the furniture surface 10. In the process, the plastic section 46 is peeled off in strips formed by separating it along the specified break lines 48. This stripwise removal of the plastic section 46 facilitates the detachment of the adhesive layer 52, since it merely has to be detached at a short parting line running at right angles to each strip of the plastic section 46.

In contrast, for loadable attaching of the retaining plate 14 on the furniture surface 10, the entire bonded surface of the plastic section 46 or the entire bonded surface of a plurality of plastic sections 46 disposed next to each other is utilized. This is achieved because the rigid structure of the retaining plate 14 permits only simultaneous separation of the adhesive layer 52 over the entire surface of all plastic sections 46.

I claim:

1. A device for attaching a loadable rigid retaining plate to a furniture surface comprising:
   a rigid retaining plate,
   a vertical support post having a bottom end attached to said retaining plate,
   an elastically compliant flexible anchor plate,
   an adhesive securing said anchor plate to the furniture surface,
   interlocking means for engaging said retaining plate and said anchor plate for preventing movement of said retaining plate perpendicular to the furniture surface,
   the under side of said retaining plate and the upper side of said anchor plate having mating faces,
   said interlocking means comprising projection blocks extending from one of said mating faces and being perpendicular to the plane of said mating face, a nose extending laterally of each projecting block, corresponding recesses in the plate having the other of said mating faces, said recesses each comprising an insertion opening for receiving a projection block and undercuts for receiving noses of said blocks when said retaining plate is moved laterally over said anchor plate into an interlocked position.

2. A device according to claim 1, and means for locking the retaining plate and the anchor plate against shifting when said plates are in the interlocked position.

3. A device according to claim 2, said locking means comprising holes in the retaining plate and the anchor aligned in the interlocked position of said plates, and a locking pin in said holes.

4. A device according to claim 1, wherein at least one of the projections and recesses are molded.

5. A device according to claim 1, wherein said projections are adhesively secured to the underside of the retaining plate.

6. A device according to claim 1, wherein said anchor plate is a shallow, plate-shaped plastic section having on its top at least one longitudinally extending projection with a nose spaced from and parallel to said plate-shaped plastic section.

7. A device according to claim 6, wherein a second said plastic section of the anchor plate with a said longitudinally extending projection and nose is fixed to the underside of the retaining plate, the said interlocking means comprising said portions.

8. A device according to claim 6, wherein the plastic section has plural, spaced projections, plastic section having break lines for enabling the breaking thereof into longitudinal strips.

9. A device according to claim 1, said anchor plate comprising a plurality of anchor plates disposed adjacent to each other.

10. A device according to claim 1, said adhesive being a releasable adhesive compound permitting separation of the anchor plate from the furniture surface.

11. A device according to claim 1, said anchor plate being permeable to a solvent for the adhesive.

12. A device for attaching a loadable rigid retaining plate to a furniture surface comprising:
    a substantially rigid retaining plate adapted to have a load bearing member attached to and extending thereabove,
    a flexible anchor plate underlying said retaining plate,
    a releasable adhesive securing said flexible anchor plate to the furniture surface,
    said retaining plate and said anchor plate comprising interlocking means for releasably attaching said retaining plate and said anchor plate to each other by movement of said retaining plate in a plane parallel to said plates, and
    said rigid retaining plate and said flexible anchor plate comprising means for preventing flexing of said flexible anchor plate when a moment tending to rotate said rigid retaining plate about a horizontal line is applied to said rigid retaining plate.

13. The device of claim 12, said retaining plate having a lower surface and said anchor plate having an upper surface, and said means for preventing flexing of said flexible anchor plate comprises said surfaces being substantially in engagement.

14. The device of claim 12, said interlocking means releasably attaching said anchor plate and said retaining means upon relative lateral movement thereof.

* * * * *